US006540860B1

(12) United States Patent
Suzuki

(10) Patent No.: US 6,540,860 B1
(45) Date of Patent: Apr. 1, 2003

(54) IMAGE FORMING METHOD

(75) Inventor: Tamotsu Suzuki, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 57 days.

(21) Appl. No.: 09/703,650

(22) Filed: Nov. 2, 2000

(30) Foreign Application Priority Data

Nov. 2, 1999 (JP) .......................................... 11-312618

(51) Int. Cl.$^7$ ......................... B44C 1/175; B32B 31/20; B32B 31/22; B41M 3/12; B41M 5/40

(52) U.S. Cl. ....................... 156/230; 156/234; 156/236; 156/240; 156/247; 156/277; 156/289; 427/148; 427/301; 427/412.1; 428/200; 428/343; 428/914

(58) Field of Search ................................ 156/230, 234, 156/236, 240, 241, 247, 277, 289; 427/146, 147, 148, 149, 402, 412.1, 801; 428/40.1, 41.8, 42.1, 42.3, 195, 200, 343, 914

(56) References Cited

U.S. PATENT DOCUMENTS

| | | | | | |
|---|---|---|---|---|---|
| 5,350,474 | A | * | 9/1994 | Yamane | 156/240 |
| 5,820,971 | A | * | 10/1998 | Kaule et al. | 428/209 |
| 5,871,837 | A | * | 2/1999 | Adair | 428/206 |
| 5,969,069 | A | * | 10/1999 | Su et al. | 526/318.44 |
| 5,984,467 | A | * | 11/1999 | Bodager et al. | 347/101 |
| 6,123,794 | A | * | 9/2000 | Saff | 156/230 |
| 6,124,417 | A | * | 9/2000 | Su | 526/318.44 |
| 6,149,754 | A | * | 11/2000 | Ogata et al. | 156/241 |
| 6,153,038 | A | * | 11/2000 | Brooker | 156/230 |
| 6,277,229 | B1 | * | 8/2001 | Popat et al. | 156/230 |
| 6,339,442 | B1 | * | 1/2002 | Miyamoto et al. | 347/71 |

* cited by examiner

*Primary Examiner*—J. A. Lorengo
(74) *Attorney, Agent, or Firm*—Sughrue Mion, PLLC

(57) ABSTRACT

With a transfer member, such as a toner sheet, provided with at least two layers including an intermediate layer having a function of preventing transfer of a substance and a thermally fusible ink layer on the supporting member side, and an image receiving member, such as image receiving sheet, used, a solution for improving the transfer sensitivity is jetted onto either of them according to the image so as to form a transfer image on the image receiving member surface.

1 Claim, 2 Drawing Sheets

IMAGE FORMING METHOD

BACKGROUND OF THE INVENTION

The present invention relates to an image forming method for forming a transferred image on the surface of an image receiving member.

As a method for forming an image on a transfer member such as paper and a film, a thermal transfer method can be presented.

The thermal transfer method comprises the steps of superimposing a transfer member (toner sheet) with a transfer layer of a pigment-based toner formed on the surface of a supporting member as a transfer material, on an image receiving member (image receiving sheet) such as paper and a film, and applying heat on the image from the back side of the supporting member of the toner sheet by a thermal head, a laser head, or the like for transferring the toner onto the image receiving sheet so as to form the image on the image receiving sheet. According to the thermal transfer method, a coloring matter is sublimated so as to be transferred onto the image receiving sheet.

Moreover, as another image forming method onto an image receiving sheet, an ink-jet method for forming an image by ejecting ink droplets without thermal transfer can be presented. An apparatus for the ink-jet method comprises a plurality of nozzle holes with ink heads provided parallel, independent ejecting rooms communicating with the nozzle holes with a part of the wall serving as an oscillating plate, a piezoelectric element mounted on the oscillating plate, and a common ink cavity for supplying an ink to the ejection rooms so that a pulse voltage based on the image information is applied onto the piezoelectric element for mechanically deflecting the oscillating plate for increasing or reducing the capacity of the ejecting rooms, and ejecting ink droplets from the nozzle holes, utilizing the pressure in the rooms changed momentarily so as to form an image on an image receiving sheet.

The method of using a thermal head in the thermal transfer method involves a problem in that the temperature distribution can easily be uneven due to irregularity of the heat resistance value, resulting in generation of irregularity in the formed image.

Moreover, a problem of the supporting member deformation due to local high temperature heating, resulting in liability of wrinkle generation also arises.

Furthermore, the method of using a laser beam in the thermal transfer method involves a problem of too high an apparatus cost. Moreover, a problem of liability of image irregularity due to the material decomposition by high temperature momentary heating also arises.

In contrast, according to the ink-jet method, for avoiding nozzle choking and for stably forming drops, an image forming material cannot be selected freely due to various limitations on the image forming material in terms of the liquid physical properties. For example, even in the case of forming a color image, in order to prevent nozzle choking, a dye or a specific pigment should be selected so that the same hue as the printing ink pigment cannot be reproduced. Therefore, it cannot be adopted in a highly sophisticated printing proof printer, and thus it is problematic. Moreover, problems of low light resistance and water resistance of a formed image, and liability of blurring of the dye on the image receiving member are involved.

As a method for solving the problems, a new method, a related art of the invention, has been filed as Japanese Patent Application No. 11-170702.

The invention of the patent application comprises the steps of preparing a transfer member having an image forming material, forming a latent image by ejecting liquid droplets containing a material for improving the transfer sensitivity onto either one of the transfer member or an image receiving member to form an image, closely contacting the transfer member and the image receiving member with the latent image interposed therebetween, passing a pressure roller heated at a temperature lower than the temperature capable of transferring the part without the latent image formation by the material for improving the transfer sensitivity and sufficient for transferring the latent image formation part by the material for improving the transfer sensitivity, and peeling off the transfer member and the image receiving member so as to form the transfer image on the image receiving member as the above-mentioned image.

In the image forming method, the transfer member is separated from the supporting member only in the part with the latent image formation so as to be transferred for forming the image on the image receiving member surface.

According to the method, an image can be obtained with a good quality. However, in contrast, in the case of forming an image with a plurality of colors in the method, formation of a second or subsequent color image may be influenced by the latent image of a preceding image so that the image range of the part can be wider than the targeted area.

As mentioned above, in forming an image with a plurality of colors using the new method, since formation of a second or subsequent color image may be influenced by the latent image of a preceding image, a problem arises in that the image range of the part can be wider than the targeted area.

SUMMARY OF THE INVENTION

In order to solve the above-mentioned problems, a first aspect of the invention is an image forming method for forming an image on an image receiving sheet, using a transfer sheet provided with at least two layers including an intermediate layer having a function of preventing permeation of a moisture content, a surfactant or the like and a thermally fusible ink layer in this order on a supporting member, and the image receiving sheet for transferring the thermally fusible ink layer thereon, wherein a solution for improving the transfer sensitivity is applied according to the image on either of the transfer sheet or the image receiving sheet.

Moreover, a second aspect of the invention is a transfer sheet to be used in an image forming method for forming an image on an image receiving sheet, using a transfer sheet provided with at least two layers including an intermediate layer having a function of preventing permeation of a moisture content, a surfactant or the like and a thermally fusible ink layer in this order on a supporting member, and the image receiving sheet for transferring the thermally fusible ink layer thereon, wherein a peeling layer is provided between the supporting member and the intermediate layer.

Furthermore, a third aspect of the invention is a transfer sheet to be used in an image forming method for forming an image on an image receiving sheet, using a transfer sheet provided with at least two layers including an intermediate layer having a function of preventing permeation of a moisture content, a surfactant or the like and a thermally fusible ink layer in this order on a supporting member, and the image receiving sheet for transferring the thermally fusible ink layer thereon, wherein a surface layer is provided on the surface of the thermally fusible ink layer.

Still further, a fourth aspect of the invention is a transfer sheet to be used in an image forming method for forming an image on an image receiving sheet, using a transfer sheet provided with at least two layers including an intermediate layer having a function of preventing permeation of a moisture content, a surfactant or the like and a thermally fusible ink layer in this order on a supporting member, and the image receiving sheet for transferring the thermally fusible ink layer thereon, wherein a back layer is provided on the back side of the supporting member.

Moreover, a fifth aspect of the invention is the transfer sheet according to any of the second to fourth aspects, wherein a polyamide resin is included as an additive material to be added in the intermediate layer.

DESCRIPTION OF THE PREFERRED EMBODIMENTS

Hereinafter, the invention will be explained with reference to FIGS. 2 to 4.

Figure 2:
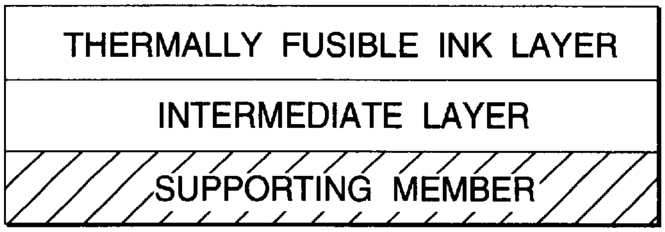
FIG. 2 is a schematic diagram showing a basic configuration of a transfer material.

FIG. 2 is a schematic diagram showing a basic configuration of a transfer sheet. FIG. 3 is a modified schematic diagram showing an actual configuration of a transfer sheet. FIG. 4 is a schematic diagram showing a configuration of an image receiving sheet.

A thermal transfer sheet according to the invention basically comprises a supporting member as a base material, an intermediate layer and a thermally fusible ink layer laminated on one side of the supporting member successively from the base material side as shown in FIG. 2. However, a few other layers are disposed as shown in FIG. 3 in the actual use for realizing the further handling convenience.

Figure 3:
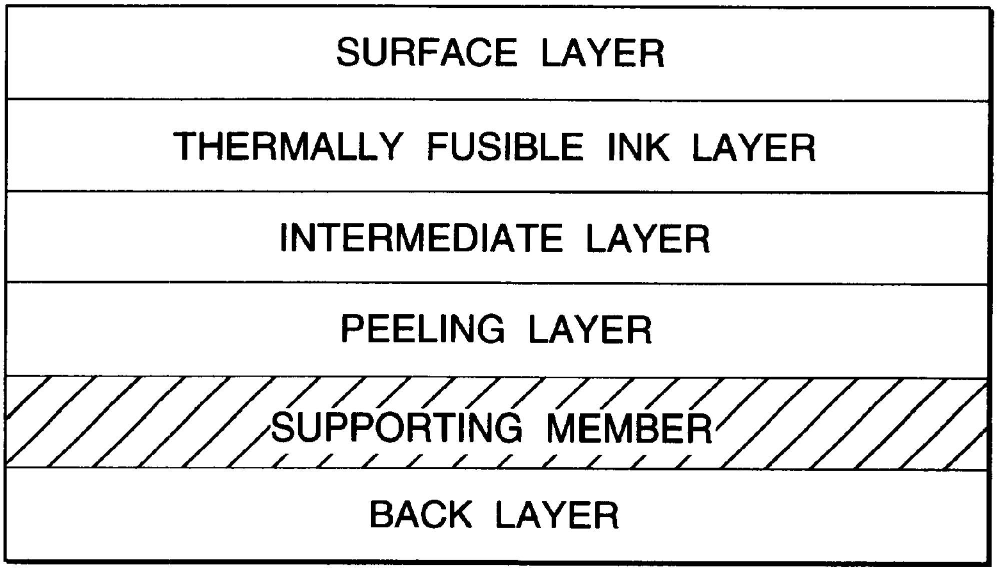
FIG. 3 is a modified schematic diagram showing an actual configuration of a transfer material.

In FIG. 3, the thermal transfer sheet comprises a supporting member as a base material, a peeling layer formed on one side of the supporting member, an intermediate layer and a thermally fusible ink layer laminated thereon, and a surface layer as the uppermost layer. A back layer is further provided on the back side. According to the configuration, influence of a latent image of a preceding color can be avoided at the time of heating by a thermal head a swell as a preferable transfer of a thermally fusible ink of any kind of color onto a material to be transferred with a relatively rough texture can be enabled.

Hereinafter, preferable embodiments of the materials of each layer of the thermal transfer sheet in the invention will be described in detail.

(1) Base Material:

Specific examples of the base material to be used for a thermal transfer sheet of the invention include plastic films such as polyester, polypropylene, polycarbonate, cellulose acetate, polyethylene, polyvinyl chloride, polystyrene, nylon, polyimide, polyvinylidene chloride, polyvinyl alcohol, fluorine resin, chlorinated rubber, and ionomer, papers such as glassine paper, condenser paper, and paraffin paper, cellophane, and non-woven fabric.

These examples can be used alone or in a combination of two or more. The thickness of the base material can be determined optionally according to the material so as to obtain a necessary strength and an adequate heat conductivity, and it is, in general, in the range of about 1 to 50 $\mu$m.

(2) Peeling Layer:

The peeling layer is a layer for facilitating the transfer of the thermally fusible ink layer and the surface layer in the region heated by the thermal head onto the material to be transferred at the time of thermal transfer. It can be eliminated in the case the peeling property of the thermally fusible ink layer with respect to the base material is sufficient, but it is provided in the case the peeling property is insufficient or unstable.

The peeling layer is made from resins having a mold release property such as waxes, silicone wax, silicone resin, fluorine resin, and acrylic resin. A method for forming the layer comprises the steps of preparing an ink by dissolving or dispersing the above-mentioned resins and a necessary additive in an appropriate solvent, and coating the same on the base material 2 by a known method such as gravure coating, followed by drying. The thickness of the peeling layer 5 is preferably about 0.5 to 5 $\mu$m.

(3) Intermediate Layer:

As the intermediate layer material, a binder is used for preventing permeation of the moisture content, a surfactant, or the like. A thermoplastic resin, a wax, or the like can further be used for improving the image resolution.

Examples of the binder include vinylidene chloride resin, urethane resin, vinyl acetate chloride resin, polyester, resin, styrene acrylic nitrile resin, polyurethane resin, polyvinyl butylal resin, styrene resin, or the like used alone, as a copolymer, or an anionic or cationic denatured product. Other examples include polyolefin resin, polyvinyl chloride resin, polyvinyl acetate, polyacrylate, polyamide resin, ionomer, and cellulose derivative. These examples can be used alone, as a mixture or a copolymer.

In order to provide the effect of adsorbing a permeated substance, a porous material such as silica and clay can further be added. Examples of waxes include micro crystalline wax, carnauba wax, and paraffin wax.

Moreover, in the case a polyamide resin is used as an additive material for the intermediate layer, the peeling property can be provided further preferably to the intermediate layer.

(4) Thermally Fusible Ink Layer:

The thermally fusible ink layer comprises, in general, a pigment and a binder. Various kinds of additives can further be added thereto as needed.

As to the pigment, pigments of colors such as black, yellow, magenta, cyan are used.

Furthermore, in the case of multi-color printing, for example, a yellow ink layer, a magenta ink layer, a cyan ink layer, and a black ink layer can be formed successively by a printing method on the same base material by a predetermined area. The amount of use of the pigments is preferably by the ratio accounting for about 5 to 70% by weight in the ink layer.

As the binder, a mixture of a thermally fusible resin and a wax, a wax alone, or a mixture of a wax and a dry oil, an ore oil, or a derivative of a cellulose or a rubber can be used.

Examples of the waxes include micro crystalline wax, carnauba wax, and paraffin wax. Furthermore, various kinds of waxes, such as Fischer Tropsch wax, various kinds of low molecular weight polyethylenes, tree wax, honey wax, whale wax, ibota wax, wool wax, shellac wax, canderira wax, petrolactam, polyester wax, partially denatured wax, aliphatic ester, and aliphatic amide can be used as well.

Moreover, the friction resistance of the ink and the bonding property with respect to a material to be transferred can be improved by mixing a thermoplastic resin with a relatively low melting point in the above-mentioned waxes. In this case, it is preferable to use the thermoplastic resin by a ratio of 5 to 300 parts by weight with respect to 100 parts by weight of the wax.

As a method for forming a thermally fusible ink layer on the base material or on the peeling layer provided on the base material, a known adequate method, such as hot melt coating, hot lacquer coating, ordinary gravure coating, gravure reverse coating, and roll coating can be used according to the form of the thermally fusible ink to be coated, that is, a hot melt type, a hot lacquer type, a solution, a dispersion, and an emulsion.

The thickness of the thermally fusible ink layer to be formed accordingly is preferably about 0.5 to 20 μm.

(5) Surface Layer:

The surface layer is made from a thermally bondable resin.

It is also possible to add other resins and fine particles for improving the running property of a transfer ribbon, preventing greasing, and preventing blocking in the wound-up state.

As the thermally bondable resin comprising the surface layer, a thermally reversible resin having a relatively low melting point can be used. Specific examples thereof include ethylene-vinyl acetate copolymer, ethylene-acrylate copolymer, polybutene, petroleum resin, vinyl chloride-vinyl acetate copolymer, and polyvinyl acetate.

As the minute particles to be included in the surface layer, for example, thermosetting resin fine particles, such as benzoguanamine resin powders, and urea resin powders, or inorganic fine particles such as silica, calcium carbonate, magnesium carbonate, clay, alumina white, kaolin, and zeolite can be used. By including these fine particles, a rugged shape can be formed in the surface layer so that blocking of the surface layer and the back side can be prevented at the time of winding up the thermal transfer sheet in a roll-like shape.

Furthermore, other necessary additives such as an anti-static agent can be added. The thickness of the surface layer is preferably about 0.1 to 5 μm.

(6) Back Layer:

The thermal transfer sheet is transferred by being heated by a thermal head of a printer from the opposite surface (back side) with respect to the surface of the base material provided with the thermally fusible ink layer at the time of the thermal transfer. Therefore, the base material may be softened and stuck depending on its material so as to hinder the movement of the thermal transfer sheet. In this case, a back layer can be provided on the back side of the base material for improving the heat resistance, the slipping property and the mold release property.

The back layer is made of a binder resin and other necessary additives. Examples of the binder resin include cellulose-based resins such as ethyl cellulose, hydroxy ethyl cellulose, hydroxy propyl cellulose, methyl cellulose, cellulose acetate, cellulose butyrate, and nitrocellulose, vinyl-based resins such as polyvinyl alcohol, polyvinyl acetate, polyvinyl butylal, polyvinyl acetal, polyvinyl pyrrolidone, acrylic resin, polyacrylamide, and acrylonitrile-styrene copolymer, polyester resins, polyurethane resins, and silicone denatured or fluorine denatured urethane resins.

Among these examples, it is preferable to utilize those having slight reactive groups such as hydroxyl groups so as to be used as a cross-linked resin layer in combination with polyisocyanate as a cross-linking agent. The thickness of the coated film can be thin, and about 0.1 to 2 μm thickness is effective. By providing the back layer, a resin film relatively weak to heat can be used as the base material. However, in the case the base material itself is excellent in terms of the heat resistance, the mold release property, and the slipping property, the back layer can be eliminated.

(7) Image Forming Apparatus:

The image forming apparatus according to the invention is an image forming apparatus for transferring a transfer material of a transfer member holding the transfer material on a supporting member onto an image receiving member according to an image, comprising a liquid droplet ejecting head for forming a latent image by ejecting liquid droplets containing a material for improving the transfer sensitivity onto the image forming surface of the transfer material of the transfer member or the image receiving member, a pressure heat roller to be heated at a temperature lower than the temperature capable of transferring the part without the latent image formation by the material for improving the transfer sensitivity and sufficient for transferring the latent image formation part by the material for improving the transfer sensitivity, for passing through on the transfer member and the image receiving member closely contacted with each other with the latent image interposed therebetween, and a peeling device for peeling off the transfer member and the image receiving member.

According to the image forming apparatus, by closely contacting the transfer member and the image receiving member with the latent image interposed therebetween, passing the heated pressure roller, and peeling off the transfer member and the image receiving member so as to separate the transfer material only for the part with the latent image formed for transfer onto the image receiving member, the image can be formed.

As the material for improving the transfer sensitivity, water, organic solvents, and surfactants can be presented. Among these examples, organic solvents to be blended freely with water at an ordinary temperature, and surfactants to be blended with water are preferable. Specific examples of the organic solvents to be blended freely with water include monohydric or polyhydric alcohols such as methanol, ethanol, propanol, ethylene glycol, propylene glycol, diethylene glycol, triethylene glycol, and glycerol, and ethers such as methyl cellosolve, ethyl cellosolve, and butyl cellosolve.

As the surfactants to be blended with water, anionic, cationic, nonionic, or amphoteric activators can be used in a concentration range to be dissolved in water. Specific examples thereof include fatty acid salt, alkyl sulfate, polyoxy ethylene alkyl ether sulfate, alkyl benzene sulfonate, alkyl naphthalene sulfonate, alkyl sulfosuccinate, alkyl diphenyl ether disulfonate, alkyl phosphate, naphthalene sulfonate formalin condensed product, polyoxy ethylene alkyl ether, polyoxy ethylene alkylene alkyl ether, polyoxy ethylene fatty acid ester, polyoxy ethylene alkyl amine, alkyl alkanol amine, alkyl amine salt, and alkyl betaine.

In jetting these materials, they can be mixed freely. Since addition of water improves the effect, it is particularly preferable. Moreover, in order to provide the ejection suitability and the liquid storage stability, a surface tension adjusting material, a mildew proof material, a viscosity adjusting material, a pH adjusting material, an anti-foaming material, or the like can be added as well.

EXAMPLE 1

Production of a Transfer Toner Sheet

Preparation of a Back Layer

With a 2.5 μm thickness polyethylene terephthalate film (Rumirar produced by Toray Corp.) used as the base material, a back layer coating liquid with the below-mentioned composition was coated and dried on one side thereof by a gravure coating method by a 0.15 g/m$^2$ (solid component) coating amount so as to form a back layer.

Composition of the Back layer Coating Liquid

Acrylic resin
(BR108 produced by Mitsubishi Rayon Corp.)
8 parts by weight

Silicone Denatured Acrylic Resin
(produced by Kubo Takashi Paint Corp.)
2 parts by weight Solvent
(MEK/toluene weight ratio 1:1)
90 parts by weight Preparation of a Peeling Layer A paraffin wax emulsion (WE65 produced by Konishi Corp.) was coated and dried on the opposite side surface of the above-mentioned back layer coated product by a gravure coating method by a 1.0 g/m$^2$ (solid component) coating amount so as to form a peeling layer.

Preparation of an Intermediate Layer

Composition of the intermediate layer coating liquid

| | |
|---|---|
| Polyurethane resin<br>(N-2301 produced by Nippon Polyurethane Industry Corp.) | 10 parts |
| Ethylene vinyl acetate copolymer<br>(EVA#150 produced by Mitsui Dupont Chemical Corp.) | 10 parts |
| Stearic amide | 10 parts |
| Solvent<br>(methyl ethyl ketone/toluene = 1:1) | 70 parts |

The material is coated and dried by a gravure coating method by a 1.0 g/m$^2$ (solid component) coating amount so as to form an intermediate layer.

Preparation of a Thermally Fusible Ink Layer

Preparation of a Pigment Dispersion

| | |
|---|---|
| Butylal resin<br>(Esurekku FPD-1 produced by Sekisui Chemical Industry Corp.) | 12.0 parts<br>(by weight - hereinafter ditto) |
| Magenta pigment<br>(Rionol Red LX-235 produced by Toyo Ink Corp.) | 12.0 parts |
| N-propyl alcohol | 110.4 parts |
| Dispersion auxiliary agent<br>(Sorusupasu S-20000 produced by ICI Corp.) | 0.8 part |

With Seika First Yellow H-0755 (produced by Dainichi Seika Corp.) used as the yellow pigment, Cyanine Blue 4820 (produced by Dainichi Seika Corp.) used as the cyan pigment, and Mitsubishi Carbon Black MA-100 (produced by Mitsubishi Kasei Industry Corp.) used as the black pigment, total 4 kinds of the pigment dispersions were prepared. 0.24 part of stearic amide and 60 parts of n-propyl alcohol were added to 10 parts of the dispersion so as to be printed successively for the four colors on the above-mentioned coated polyester film by a 0.38 μm dry film thickness.

Preparation of the Surface Layer

The below-mentioned liquid composition was applied by a gravure coating by a 0.10 μm thickness.

| | |
|---|---|
| Ethylene-vinyl acetate copolymer (thermally bondable resin) (EVA#150 produced by Mitsui Dupont Chemical Corp.) | 4 parts by weight |
| Ethylene-vinyl acetate copolymer (thermally bondable resin) (EVA KA-10 produced by Sumitomo Chemical Industry Corp.) | 4 parts by weight |
| solvent (MEK/toluene weight ratio 1:1) | 180 parts by weight |

COMPARATIVE EXAMPLE 1

A product same as the example 1 except that the intermediate layer is eliminated was produced as a comparative example.

Figure 4:
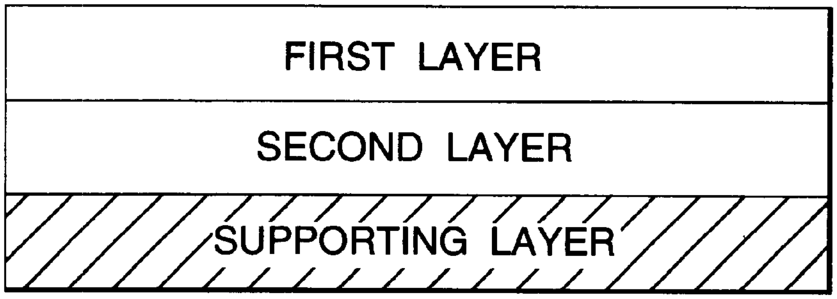
FIG. 4 is a schematic diagram showing a configuration of an image receiving material.

As shown in FIG. 4, the configuration of the image receiving sheet comprises the second layer and the first layer provided successively from the supporting member side on the supporting member.

Production of an Image Receiving Sheet

First Layer Coating Liquid

| | |
|---|---|
| Vinyl chloride, vinyl acetate copolymer<br>(Sorubain C12 produced by Nisshin Chemical Corp.) | 160 parts |
| Ethylene, vinyl acetate copolymer<br>(Eruparoi 742 produced by Mitsui Dupont Chemical Corp.) | 61 parts |
| Polyester sebacate<br>(EN-G25 produced by Nippon Soda Corp.) | 28 parts |
| Perfluoroalkyl group-containing oligomer<br>(Megafakku F-178K produced by Dainippon Ink Chemical Industry Corp.) | 4 parts |
| Methyl ethyl ketone | 630 parts |
| Toluene | 210 parts |
| Dimethyl formamide | 30 parts |

Second Layer coating Liquid

| | |
|---|---|
| Polyvinyl butylal resin<br>(Denka Butylal #2000-L produced by Denki Kagaku Kogyo Corp.) | 16 parts |
| N,N-dimethyl acrylamide-butyl acrylate copolymer | 4 parts |
| Perfluoroalkyl group-containing oligomer<br>(Megafakku F-177 produced by Dainippon Ink Chemical Industry Corp.) | 0.5 part |
| n-propyl alcohol | 200 parts |

The first layer coating liquid was coated on a 180 μm thickness PET film with a rotation coater so as to have a 20 μm film thickness after drying at 100° C. The second layer coating liquid was coated on the first layer coated layer with a rotation coated, and dried at 100° C. so as to have a 2 μm second layer film thickness for forming an image receiving member.

Production of a Solution 4 for Lowering the Transfer Temperature

| | |
|---|---|
| Distilled water | 10 parts |
| Polyethylene glycol | 1 part |

Figure 1A:
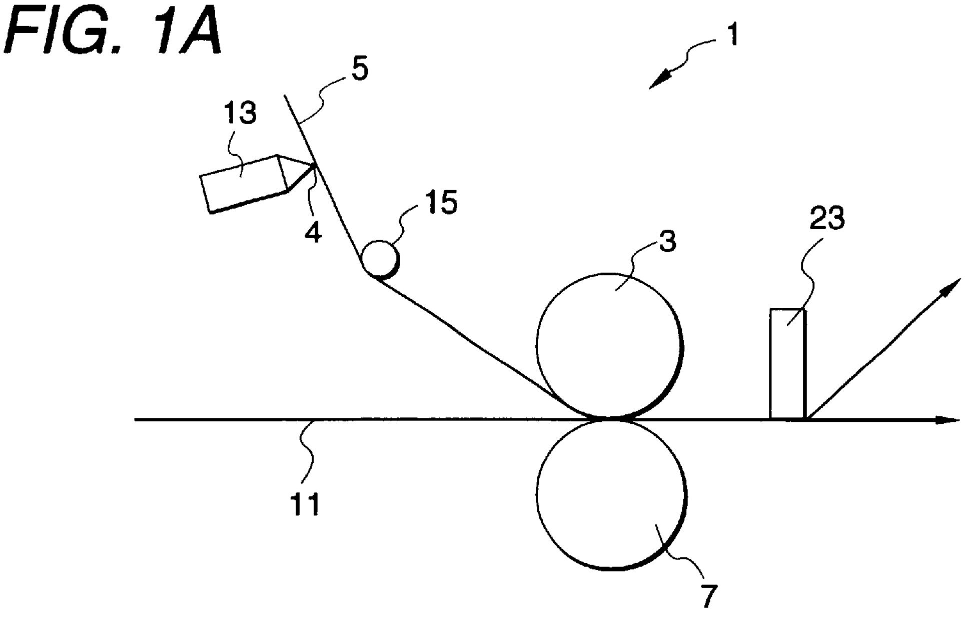
FIGS. 1A and 1B are schematic diagrams showing the configuration of an image forming apparatus according to the invention, with liquid droplets ejected to the transfer member side (FIG. 1A); and to the image receiving sheet side (FIG. 1B)
Figure 1B:
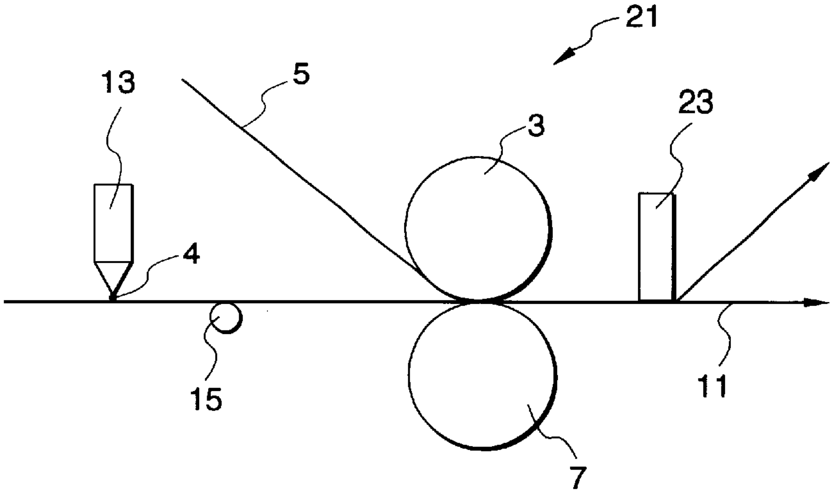

FIGS. 1A and 1B are schematic diagrams showing the configuration of an image forming apparatus according to the invention, with liquid droplets ejected to the transfer member side (FIG. 1A); and to the image receiving sheet side (FIG. 1B).

In the image forming apparatus 1 shown in FIG. 1A, the transfer member 5 with the transfer material surface disposed downward and the image receiving member 11 with the image receiving surface disposed upward were interposed and passed between a supporting drum 3 and a pinch roller 7.

At the time, the solution 4 for lowering the transfer temperature was jetted from an ejecting head 13 onto the transfer material surface of the transfer member 5 according to an image so as to form a latent image. By passing through a pressure roller with the pinch roller 7 temperature set at 80° C. and peeling off the transfer member 5 and the image receiving member 11, the transfer material was transferred onto the image receiving surface, corresponding to the latent image formation part. The operation was repeated for the four colors including Y, M, C and K.

Result: Although the four color images reproduced the targeted dot area without suffering influence of a preceding color in the example, image formation of the second or subsequent color was influenced by a preceding color printed part so as to change the dot area in the comparative example.

In the image forming apparatus 1 shown in FIG. 1B, similarly, the image receiving member 11 with the image receiving surface disposed upward and the transfer member 5 with the transfer material surface disposed downward were interposed and passed between a supporting drum 3 and a pinch roller 7.

At the time, the solution 4 for lowering the transfer temperature was jetted from an ejecting head 13 onto the image receiving surface of the image receiving member 11 according to an image so as to form a latent image. By passing through a pressure roller with the pinch roller 7 temperature set at 80° C. and peeling off the transfer member 5 and the image receiving member 11, the transfer material was transferred onto the image receiving surface, corresponding to the latent image formation part. The operation was repeated for the four colors including Y, M, C and K. As a result, similarly, the four color images reproduced the targeted dot area without suffering influence of a preceding color in the example.

As heretofore explained, according to an image forming method of the invention, in forming an image with a plurality of colors, influence of a latent image of a preceding image can be prevented in formation of a second or subsequent color image, and thus image reproduction faithful to the primary information can be enabled.

What is claimed is:

1. An image forming method for forming an image on an image receiving sheet, comprising:

applying a solution for improving a transfer sensitivity, according to the image, on an image receiving sheet to transfer the image from a transfer sheet provided with at least two layers including an intermediate layer having a function of preventing permeation of a moisture content and a surfactant, and a thermally fusible ink layer in this order on a supporting member; and forming the image by transferring the thermally fusible ink layer on the image receiving sheet.

* * * * *